(12) United States Patent
Tadeparthy et al.

(10) Patent No.: US 10,075,076 B1
(45) Date of Patent: Sep. 11, 2018

(54) VOLTAGE CONVERTER WITH CURRENT STEERING

(71) Applicant: TEXAS INSTRUMENTS INCORPORATED, Dallas, TX (US)

(72) Inventors: Preetam Tadeparthy, Bengaluru (IN); Brian Carpenter, Cary, NC (US); Nitin Agarwal, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/838,527

(22) Filed: Dec. 12, 2017

(51) Int. Cl.
| | |
|---|---|
| *H03K 17/16* | (2006.01) |
| *H02M 3/158* | (2006.01) |
| *H02M 3/337* | (2006.01) |
| *H02M 1/00* | (2006.01) |
| *H02M 1/42* | (2007.01) |

(52) U.S. Cl.
CPC ....... *H02M 3/1582* (2013.01); *H02M 3/3378* (2013.01); *H02M 2001/0058* (2013.01); *H02M 2001/4291* (2013.01)

(58) Field of Classification Search
CPC ........ H03K 17/163; H03K 17/044206; H02M 3/1588; H02M 2001/0045
USPC ......... 323/222, 271, 272, 282–288; 327/536, 327/538, 108–112, 170, 427, 408, 376
See application file for complete search history.

(56) References Cited

U.S. PATENT DOCUMENTS

| | | | | |
|---|---|---|---|---|
| 7,508,174 B2* | 3/2009 | Wei | ..................... | H02M 3/1588 323/223 |
| 7,535,283 B2* | 5/2009 | Kojima | .............. | H03K 17/0828 327/108 |
| 2010/0117682 A1* | 5/2010 | Al-Shyoukh | ...... | H03K 3/35613 326/80 |
| 2012/0025919 A1* | 2/2012 | Huynh | ................ | H02M 3/1563 331/34 |
| 2015/0035584 A1* | 2/2015 | Fujita | ................... | H03K 17/163 327/384 |

* cited by examiner

*Primary Examiner* — Rajnikant Patel
(74) *Attorney, Agent, or Firm* — Charles A. Brill; Frank D. Cimino

(57) ABSTRACT

A voltage converter circuit includes a high side transistor, a high side driver coupled to a control input of the high side transistor, a low side transistor coupled to the high side transistor at a switch node, and a current steering circuit coupled to the control input of the high side and to the switch node. During transition of the high side transistor to an on state, a current from the high side driver initially divides between the control input of the high side transistor and the current steering circuit, and as a voltage on the switch node increases, less of the current from the high side driver flows through the current steering circuit and more of the current from the high side driver flows to the control input of the high side transistor.

20 Claims, 2 Drawing Sheets

VOLTAGE CONVERTER WITH CURRENT STEERING

BACKGROUND

Low-power loss and highly efficient voltage converters, such as synchronous buck converters, are in demand for many applications such as mobile devices and other types of devices. As process technology advances, the tradeoff between efficiency and voltage ringing becomes more significant. Voltage ringing due to parasitics may require the choice of transistors for the converter to be rated for more than twice the voltage rating of normal operation.

One technique for addressing the efficiency problem (in which the converter itself consumes power) is to enhance the high side transistor switch of the buck converter as soon as possible to reduce voltage-current overlap losses. However, this approach results in parasitic inductance becoming excited with higher di/dt (rate of change of current) that causes high ringing in parasitic capacitors. In some examples, the peak voltage of the ringing can be twice (or higher) the input voltage of the converter. The rise time of the high side transistor switch can be reduced to reduce the ringing, but doing so results in increased losses and reduced efficiency.

SUMMARY

In accordance with at least one embodiment, a voltage converter circuit includes a high side transistor, a high side driver coupled to a control input of the high side transistor, a low side transistor coupled to the high side transistor at a switch node, and a current steering circuit coupled to the control input of the high side and to the switch node. During transition of the high side transistor to an on state, a current from the high side driver initially divides between the control input of the high side transistor and the current steering circuit, and as a voltage on the switch node increases, less of the current from the high side driver flows through the current steering circuit and more of the current from the high side driver flows to the control input of the high side transistor.

In another embodiment, a system includes a high side transistor and a high side driver coupled to a control input of the high side transistor. The system also includes a low side transistor coupled to the high side transistor at a switch node. A third transistor also is included. The third transistor includes a first terminal coupled both to the control input of the high side and to the high side driver, a second terminal coupled to the switch node, and a third control input terminal coupled to a fixed reference voltage node.

In yet another embodiment, a method includes iteratively turning on a low side transistor by a low side driver followed by turning on a high side transistor by a high side driver to produce an output voltage. Turning on the high side transistor includes a first phase in which some of a current from the high side driver flows to a control input of the high side transistor and the rest of the current from the high side driver flows through a current steering circuit. Turning on the high side transistor also includes a second phase in which, as a result of a voltage on a switch node between the high and low side transistors increasing to a first threshold, less of the current from the high side driver flows to the current steering circuit and more of the current from the high side driver flows to the control input of the high side transistor.

BRIEF DESCRIPTION OF THE DRAWINGS

For a detailed description of various examples, reference will now be made to the accompanying drawings in which.

DETAILED DESCRIPTION

In accordance with the disclosed embodiments, a switching voltage converter includes a high side transistor and a low side transistor, which are turned on and off by way of control signals. The voltage converter also includes a current steering circuit that causes a control current to the high side transistor to be lower than would be the case absent the current steering circuit during an initial phase of turning on the high side transistor. During a latter phase of turn on of the high side transistor, less current flows through the current steering circuit thereby causing an increase in control current to the high side transistor. The high side transistor thus is driven at a weaker level (e.g., at a slower rate of being turned on) during the initial phase and at a stronger level (e.g., at a faster rate) during the latter phase. As a result, the time rate of increase of the control current to the high side transistor is smaller during the initial phase thereby reducing ringing compared to a larger time of current increase, and the time rate of increase of the control current is larger during the latter phase (than in the initial phase) thereby reducing power dissipation in the high side transistor and increasing efficiency of the voltage converter.

Figure 1:
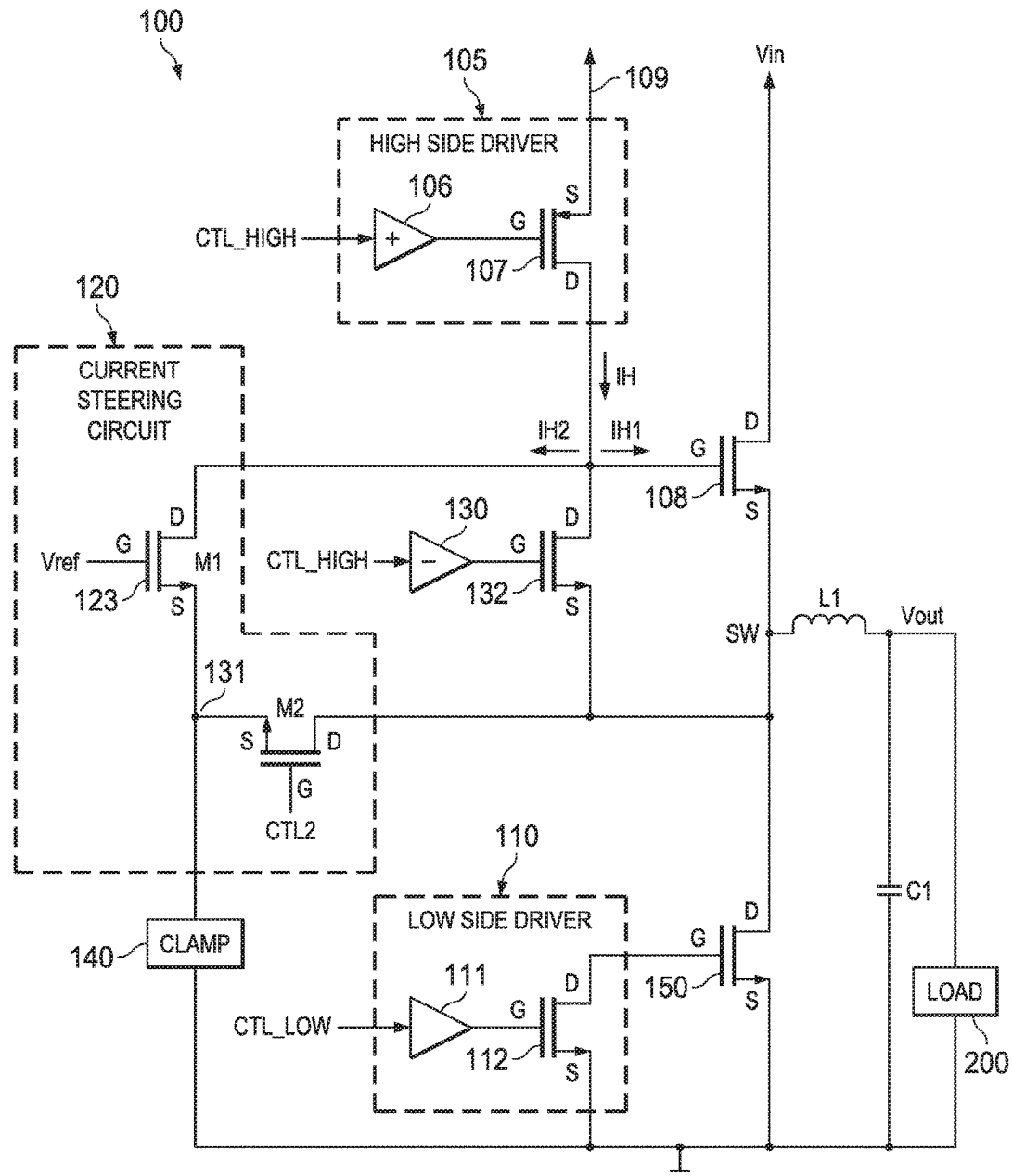
FIG. 1 illustrates an example of a voltage converter circuit in accordance with various embodiments.

FIG. 1 shows an example of a voltage converter circuit 100 in accordance with various embodiments. Although a buck-style architecture is depicted, the principles disclosed herein apply to other architectures as well such as full bridge converters, forward converters, etc. The voltage converter produces a regulated output voltage, Vout, from an input voltage, Vin. The illustrative voltage converter circuit 100 includes a high side transistor 108, a low side transistor 150, an inductor L1, a capacitor C1, a high side driver 105, a low side driver 110, a current steering circuit 120, a buffer 130, transistor 132, and a voltage clamp 140. The high and low side transistors of the example of FIG. 1 are n-type metal oxide semiconductor field effect transistors (n-type MOSFETs or "NMOS transistors"), but can be implemented as other types of transistors in other embodiments. The source (S) of the high side transistor 108 is coupled to the drain (D) of the low side transistor 150 at a node designated as the switch node (SW). The inductor L1 also is connected to the switch node in this circuit and the opposing terminal of the inductor L1 connects to the capacitor C1 and provides the output voltage, Vout, which can be used to power a load 200 to which the voltage converter circuit 100 is connected.

The high side driver includes a buffer 106 coupled to a transistor 107. Transistor 107 is a p-type MOSFET in this example circuit. The source of transistor 107 is connected to a positive voltage node 109 which may be the input voltage (Vin) to the voltage converter, or another voltage. The drain of transistor 107 is connected to the control input (e.g., gate) of the high side transistor 108. Transistor 132 connects between the drain of transistor 109 and the switch node SW as shown and is used to discharge the high side transistor. Buffer 130 connects to the gate of transistor 132 and turns the transistor 132 on and off based on a control input signal (e.g., CTL_HIGH).

The drain of the low side transistor 150 connects to the switch node. The source of the low side transistor 150 connects to ground. The low side driver 110 includes a buffer 111 coupled to a transistor 112. Transistor 112 is an n-type MOSFET in this example circuit. The drain of transistor 112 connects to the control input (e.g., gate) of the low side transistor 150. The source of transistor 112 is connected to ground.

In accordance with the example voltage converter circuit 100 of FIG. 1, the current steering circuit 120 includes transistors M1 and M2. In this example, M1 and M2 are NMOS transistors, but can comprise other types of transistors in other embodiments. The drain of M1 is connected both to the high side driver 105 (e.g., to the drain of the transistor 107 within the high side driver 105) and to the control input (gate) of the high side transistor 108. The sources of M1 and M2 are connected together at node 131, and the drain of M2 is connected to the switch node SW. The gate of M1 is connected to a fixed reference voltage node 123 (Vref), and the gate of M2 is controlled by a control signal, CTL2.

The voltage clamp 140 couples between ground and the node 131 interconnecting M1 and M2. The voltage clamp ensures that the voltage on node 131 remains below a predetermined threshold voltage level so as not to damage M1 when the voltage on the switch node SW is high.

In operation, a control input signal (CTL_HIGH) is provided to the buffer 106 of the high side driver 105 to turn on and off the transistor 107. When transistor 107 of the high side driver 105 is on, current flows to the gate of the high side transistor 108 to thereby turn on the high side transistor. Similarly, a control input signal (CTL_LOW) is provided to buffer 111 of the low side driver 110 to turn on and off the transistor 112. When transistor 112 of the low side driver 110 is on, current flows to the gate of the low side transistor 150 to thereby turn on the low side transistor. To regulate the output voltage Vout, a controller (not shown) asserts the CTL_HIGH and CTL_LOW control signals to the high and low side drivers, respectively, so as to turn on the high side transistor 108 (with the low side transistor 150 off), followed by a dead time in which neither the high nor the low side transistors are on, followed by the low side transistor 150 turned on (with the high side transistor 108 off). This process is repetitive. When the high side transistor 108 is on (and low side transistor 150 is off), the switch node is pulled high. Conversely, when the low side transistor 108 is on (and high side transistor 108 is off), the switch node is pulled low. The voltage on the switch node thus approximates a square wave. The controller that asserts the CTL_HIGH and CTL_LOW control signals for the high and low side transistors 108, 150 implements a duty cycle that causes the average voltage on the switch node SW to be the desired output voltage Vout. The inductor L1 and capacitor C1 effectively filter the switch node voltage to produce a direct current (DC) level output voltage Vout.

Turning on the high side transistor 108 too rapidly, however, can result in ringing on the switch node SW. Turning on the high side transistor more slowly can diminish the amount of ringing, but cause the converter to operate less efficiently as more energy is dissipated in the high side transistor 108.

As is shown in FIG. 1, the gate of M1 is connected to a fixed voltage reference node (Vref). M1 turns on when its gate-to-source voltage (VGS) is greater than the threshold voltage of M1. The control signal CTL2 to M2 is asserted high (e.g., by the controller, not shown) to turn on M2 at about the time that the CTL_HIGH is asserted to turn on the high side transistor 108. When the low side transistor 150 is on, the switch node voltage is low which causes M1 to turn on. With M1 being on, a low resistance path from the high side driver 105 is established. Thus, when CTL_HIGH is subsequently asserted to cause the high side driver 105 to produce current IH, a portion of IH (IH2) is caused to flow through M1 of the current steering circuit 120 and the rest of IH (IH1) is provided to the gate of the high side transistor 108. With gate current provided to the high side transistor 108, the high side transistor 108 begins to turn on.

Turning on the high side transistor 108 (while the low side transistor 150 is off) causes the voltage on the switch node SW to begin to rise towards Vin. Once the voltage on the switch node reaches a level that is the fixed reference voltage to the gate of M1 less M1's threshold voltage, M1 enters its triode or linear region in which M1 begins to turn off and behaves as a resistor thereby reducing the amount of current (IH2) from the high side driver 105 that flows through M1 and increasing the amount of current (IH1) to the gate of the high side transistor 108. Increasing the amount of gate current to the high side transistor 108 upon M1 beginning to turn off causes the high side transistor 108 to turn on at a faster rate than before M1 began to turn off. As the switch node voltage increases even more, M1 eventually shuts off completely (M1's VGS is too low to keep M1 on) and all of the current IH from the high side driver 105 flows to the gate of high side transistor 108 thereby driving it hard. At this point IH1 equals IH.

Figure 2:
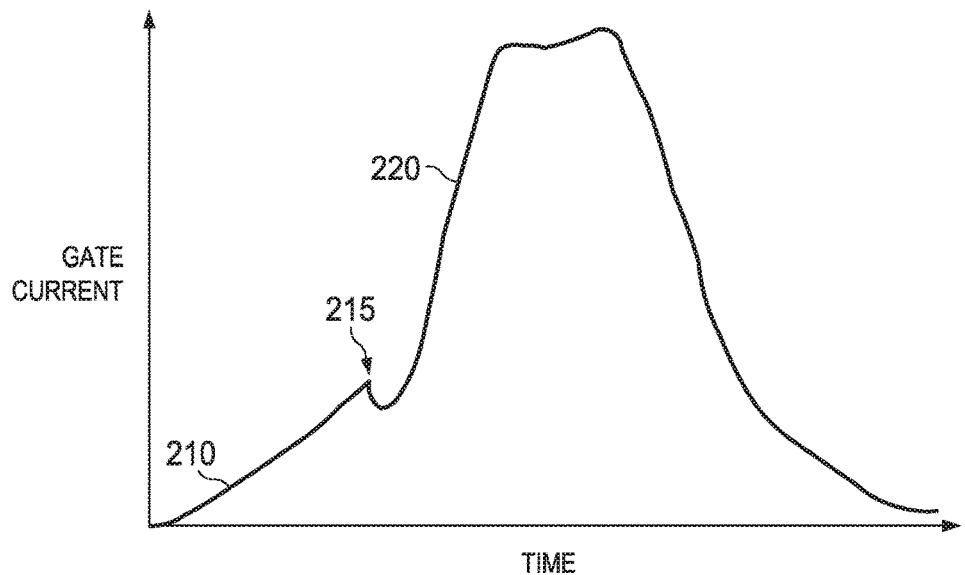
FIG. 2 illustrates a waveform in accordance with the disclosed embodiments.

FIG. 2 shows an illustrative waveform of the gate current IH1 to the high side transistor 108 during the time that the transistor turns on. Initially, the magnitude of the gate current at 210 increases relatively slowly low due to the action of the current steering circuit 120. Point 215 identifies the point at which M1 begins to turn off due to the increasing switch node voltage. From that point forward, the current steering circuit 120 begins to conduct less current from the high side driver 105 and, as illustrated at 220, the gate current to the high side transistor 108 increases at a much faster rate and to a greater magnitude thereby causing high side transistor 108 to more quickly turn on than would have been the case if the current steering circuit 120 continued to steer away a portion of the high side driver current IH. Because the gate current increases relatively slowly initially, the peak amplitude of the reverse recovery current advantageously will be smaller than would have been the case without the current steering circuit 120.

In accordance with the disclosed embodiments, therefore, during an initial phase of the transition of the high side transistor 108 to the on state, current IH from the high side driver 105 divides between the gate of the high side transistor 108 and the current steering circuit 120. As such, less current (less than IH) is provided to the gate of the high side transistor 108 and thus during this initial phase, the high side transistor 100 is turned on slower than would have been the case had the current steering circuit 120 not provided another current path. As a voltage on the switch node increases, less of the current from the high side driver circuit flows through the current steering circuit 120 and more of the current from the high side driver 105 flows to the control input of the high side transistor 108.

When the low side transistor 150 again is turned on, the switch node voltage is pulled low thereby causing M1 to again turn on. As such, M1 is turned on and off as a result of the voltage on the switch node SW. Because the gate of M1 is connected to fixed voltage reference, no control signal need be generated and provided to the gate of M1. Consequently, M1 is turned on and off quickly and with a timing that is inherently based on the switch node voltage.

Figure 3:
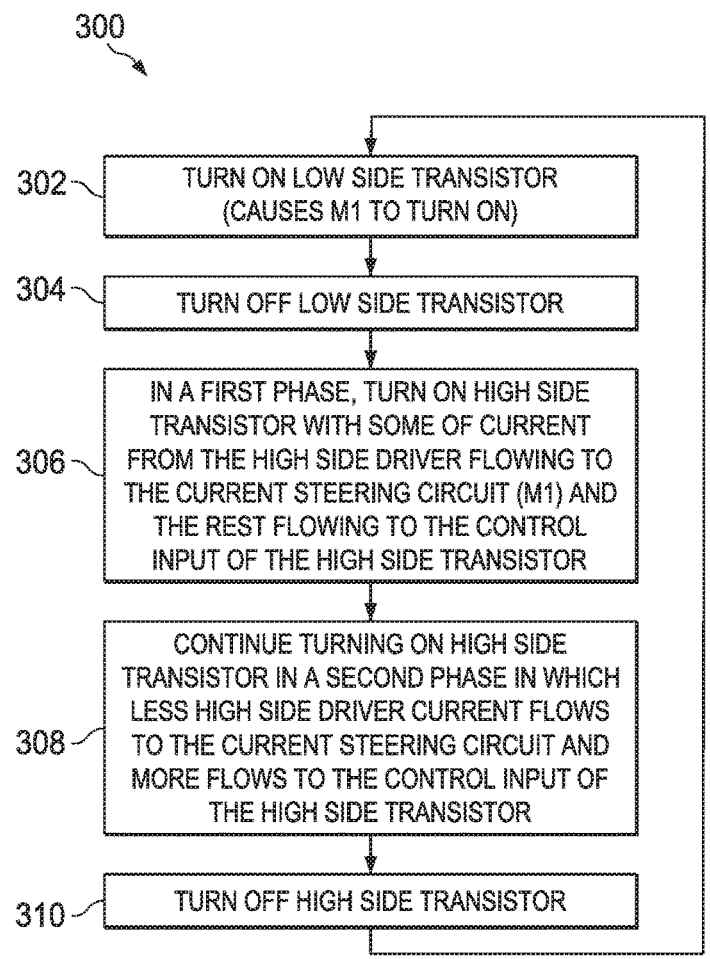
FIG. 3 is a flow chart of a method in accordance with various embodiments.

FIG. 3 shows an example of a method 300 for operating the voltage converter described herein. The operations may be performed in the order shown, or in a different order. At 302, the method includes turning on the low side transistor 150. This operation may be performed by the low side driver in response to a control signal from a controller (e.g., a pulse width modulation controller). As a result of turning on the low side transistor 150, the voltage on the switch node SW goes low thereby turning on M1 in the current steering circuit 120.

At 304, the method includes turning off the low side transistor thereby creating a dead time in which neither the high nor the low side transistor is on. At 306 and 308, the high side transistor 108 is turned on. In a first phase (306), some of the current (IH1) from the high side driver 105 flows to the control input of the high side transistor 108 and the rest of the current (IH2) from the high side driver flows through M1 of the current steering circuit.

At 308, in the second phase of turning on the high side transistor, as a result of the voltage on a switch node SW increasing to a first threshold (e.g., Vref−Vth of M1), less of the current from the high side driver 105 flows to M1 of the current steering circuit 120 and more of the current from the high side driver 105 flows to the control input of the high side transistor 108, as explained above thereby driving the high side transistor to turn on at a faster rate than in the first phase.

At 310, the method includes turning off the high side transistor thereby creating another dead time in which neither the high nor the low side transistor is on. The process illustrated in FIG. 3 is iterative as shown.

Certain terms are used throughout the following description and claims to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection via other devices and connections. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A voltage converter circuit, comprising:
a high side transistor;
a high side driver coupled to a control input of the high side transistor;
a low side transistor coupled to the high side transistor at a switch node; and
a current steering circuit coupled to the control input of the high side and to the switch node;
wherein, during transition of the high side transistor to an on state, a current from the high side driver initially divides between the control input of the high side transistor and the current steering circuit, and as a voltage on the switch node increases, less of the current from the high side driver flows through the current steering circuit and more of the current from the high side driver flows to the control input of the high side transistor.

2. The voltage converter circuit of claim 1, wherein the current steering circuit comprises a third transistor through which a portion of the current from the high side transistor flows, and wherein the third transistor includes a control terminal connected to a reference voltage node.

3. The voltage converter circuit of claim 1, wherein the current steering circuit comprises a third transistor, wherein a first terminal of the third transistor is coupled to the control input of the high side transistor, a second terminal of the third transistor is coupled to the switch node, and a third control input terminal of the third transistor is connected to a reference voltage node.

4. The voltage converter circuit of claim 3, wherein the current steering circuit further comprises a fourth transistor coupled between the second terminal of the third transistor and the switch node.

5. The voltage converter circuit of claim 4, wherein the fourth transistor includes a control input whose control signal is configured to cause the fourth transistor to be off when the high side transistor is on and to be on when the low side transistor is on.

6. The voltage converter circuit of claim 1, wherein the current steering circuit comprises a third transistor, and wherein the third transistor includes a control input terminal that is connected to a reference voltage node such that the switch node voltage causes the third transistor to turn on responsive to the switch node voltage being at a lower level and causes the third transistor to turn off responsive to the switch node voltage being at a higher level.

7. The voltage converter circuit of claim 1, further comprising a low side driver coupled to a control input of the low side transistor, and wherein the current steering circuit comprises a third transistor having a gate terminal and source terminal, and wherein the gate terminal is coupled to a fixed reference voltage node and the source terminal is coupled to the switch node, wherein:
responsive to the low side transistor being on, the switch node voltage becomes low thereby forcing the third transistor to be on resulting in some of the current from the high side driver flowing through the third transistor rather than to control input of the high side transistor;
responsive to the low and high side drivers asserting signals to the respective control inputs of the low and high side transistors to turn off the low and high side transistors, a diode within the low side transistor sources current to the switch node and the switch node voltage begins to increase; and
responsive to the switch node voltage reaching a level that is the fixed reference voltage less a threshold voltage of the third transistor, the third transistor begins to turn off thereby reducing the amount of current from the high side driver that flows through the third transistor and increasing the amount of current to the control input of the high side transistor.

8. The voltage converter circuit of claim 1, further including a clamp circuit coupled to the current steering circuit to prevent the switch node voltage from exceeding a predetermined maximum voltage.

9. In a system having a high side transistor, a high side driver coupled to a control input of the high side transistor, a low side transistor coupled to the high side transistor at a switch node, and a low side driver coupled to a control input of the low side transistor, a circuit comprising:
a third transistor comprising a first terminal to be coupled both to the control input of the high side and to the high side driver, a second terminal to be coupled to the switch node, and a third control input terminal to be coupled to a fixed reference voltage node.

10. The system of claim 9, wherein, during transition of the high side transistor to an on state, a current from the high side driver divides between the control input of the high side transistor and the third transistor, and as a voltage on the switch node increases, less of the current from the high side driver circuit flows through the third transistor and more of the current from the high side driver flows to the control input of the high side transistor.

11. The system of claim 9, further comprising a fourth transistor connected between the second terminal of the third transistor and the switch node.

12. The system of claim 11, wherein the fourth transistor includes a control input whose control signal is configured to cause the fourth transistor to be off when the high side transistor is on and to be on when the low side transistor is on.

13. The system of claim 9, wherein responsive to the switch node voltage being at a first level, the third transistor is configured to turn on, wherein responsive to the switch node being a second level, the third transistor is configured to turn off.

14. The system of claim 9, wherein:
responsive to the low side transistor being on, the switch node voltage becomes low thereby forcing the third transistor to be on resulting in some of the current from the high side driver flowing through the third transistor and some of the current from the high side driver flowing to the control input of the high side transistor;
responsive to the low and high side drivers asserting signals to the respective control inputs of the low and high side transistors to turn off the low and high side transistors, a diode within the low side transistor sources current to the switch node and the switch node voltage begins to increase; and
responsive to the switch node voltage reaching a level that is the fixed reference voltage less a threshold voltage of the third transistor, the third transistor begins to turn off thereby reducing the amount of current from the high side driver that flows through the third transistor and increasing the amount of current to the control input of the high side transistor.

15. The system of claim 9, further including a clamp circuit coupled to the third transistor to prevent the switch node voltage from exceeding a predetermined maximum voltage.

16. The system of claim 9, further comprising an inductor coupled to the switch node and a load coupled to the inductor, wherein the load is powered by current through the inductor.

17. A method, comprising:
iteratively turning on a low side transistor by a low side driver followed by turning on a high side transistor by a high side driver to produce an output voltage;
wherein turning on the high side transistor includes:
a first phase in which some of a current from the high side driver flows to a control input of the high side transistor and the rest of the current from the high side driver flows through a current steering circuit; and
a second phase in which, as a result of a voltage on a switch node between the high and low side transistors increasing to a first threshold, less of the current from the high side driver flows to the current steering circuit and more of the current from the high side driver flows to the control input of the high side transistor.

18. The method of claim 17, wherein turning on the low side transistor forces the voltage on the switch node to decrease thereby turning on a transistor in the current steering circuit to establish a current path from the high side driver, wherein the transistor in the current steering circuit includes a control input tied to a fixed reference voltage.

19. The method of claim 18, wherein the first threshold is the threshold voltage of the current steering circuit's transistor below the fixed reference voltage.

20. The method of claim 17, wherein responsive to the switch node voltage reaching a second threshold, none of the current from the high side driver flows to the current steering circuit and all of the current from the high side driver flows to the control input of the high side transistor.

* * * * *